W. M. Lewis,
Sheet Metal Can.
No. 98,780. Patented Jan. 11, 1870.
Fig. 1.
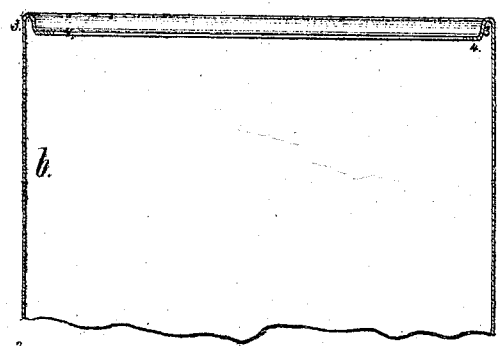
Fig. 3.
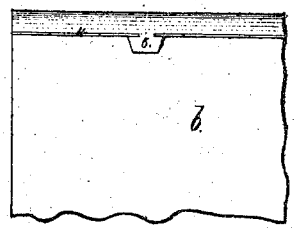
Fig. 4.
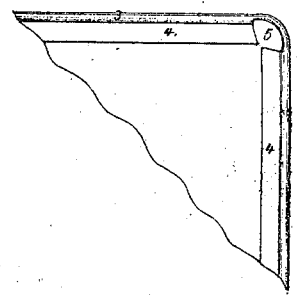
Fig. 2.
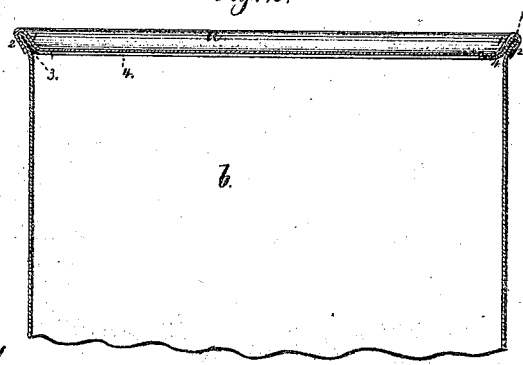
Witnesses.
Chas. H. Smith
Harold Serrell
Wm. M. Lewis
per L. W. Serrell atty

United States Patent Office.

WILLIAM M. LEWIS, OF NEW YORK, N. Y.

Letters Patent No. 98,780, dated January 11, 1870.

IMPROVEMENT IN SHEET-METAL CANS.

The Schedule referred to in these Letters Patent and making part of the same.

*To all whom it may concern:*

Be it known that I, WILLIAM M. LEWIS, of the city and State of New York, have invented an Improvement in Sheet-Metal Cans; and the following is declared to be a correct description thereof.

In the manufacture of sheet-metal cans, it is usual to turn up a flange around the edges of the sheet-metal of the heads, which flange slips outside of the body or sides of the can, and is there soldered.

In cans made in this manner, the soldering has to be heavy and costly, because the solder is depended upon to unite the sheet-metal, to stiffen the angles of the can, to largely bear the weight of the contents pressing upon the lower head or bottom, and to withstand external pressure against the side near the head.

The object of my invention is to unite the sheet-metal at the angles of the can, in such a manner that the soldering will only be required for making a tight joint, the weight and strain being taken almost entirely upon the sheet-metal itself.

By my improvement the can is rendered less costly, because the expense of soldering is less, and the quality of the tin does not require to be as good, for the mode of manufacture strengthens the can throughout, and the can hence is more durable and reliable.

In the drawing—

Figure 1 shows the top *a* of the can in section, and a portion of the sides *b*, ready to be placed together;

Figure 2 is a section of the same parts put together, clinched by bending, and ready for soldering;

Figure 3 shows a portion of the sheet-metal, where the same is to be bent to form an angle or corner; and Figure 4 is a plan of such corner.

The end or top *a* of the can is bent, with a rim around it composed of the incline 1 and rim-flange 2.

The sheet-metal forming the sides of the can is folded at the edges, so that the metal is made double, as at 3, and a seat, 4, is also formed for the head or end of the can to rest upon.

The metal of the seat 4, at the corners or angles of the can, is notched and bent down flat against the side of the can, as seen at 5, in order that the metal may be bent at the angle, as seen in fig. 4.

The portions 1, 2, 3, of the end and sides of the can are pressed together by dies or suitable means, so as to set close and grasp or clinch, as shown in fig. 2, and these parts standing at a slight inclination to the sides, the angle becomes very stiff, and adapted to resist pressure in any direction, and the head or end is firmly retained, and the sides cannot be pressed in; hence the soldering is required principally to prevent leakage, and very little solder is necessary.

I claim, as my invention—

1. Securing the end of the can to the sides by the folds 1, 2, 3, 4, of the sheet-metal, in the manner specified.

2. The notched portion 5 of the flange 4, bent down against the side of the can at the corner or angle, combined with the folds 1, 2, 3, of the sheet-metal, in the manner specified.

Dated December 14, 1869.

W. M. LEWIS.

Witnesses:
CHAS. H. SMITH,
GEO. T. PINCKNEY.